United States Patent
Lemmen et al.

(10) Patent No.: US 11,212,971 B2
(45) Date of Patent: Jan. 4, 2022

(54) DEVICE FOR GROWING MUSHROOMS

(71) Applicants: Jacobus Alexander Jozef Lemmen, Venlo (NL); Marcus Gerardus Maria Van Doremaele, Velddriel (NL)

(72) Inventors: Jacobus Alexander Jozef Lemmen, Venlo (NL); Marcus Gerardus Maria Van Doremaele, Velddriel (NL)

( * ) Notice: Subject to any disclaimer, the term of this patent is extended or adjusted under 35 U.S.C. 154(b) by 171 days.

(21) Appl. No.: 16/538,019

(22) Filed: Aug. 12, 2019

(65) Prior Publication Data

US 2020/0045896 A1 Feb. 13, 2020

(30) Foreign Application Priority Data

Aug. 10, 2018 (NL) ...................... 2021456

(51) Int. Cl.
*A01G 18/62* (2018.01)
*A01G 18/64* (2018.01)

(52) U.S. Cl.
CPC ............. *A01G 18/62* (2018.02); *A01G 18/64* (2018.02); *B65G 2201/0202* (2013.01)

(58) Field of Classification Search
CPC ........ A01G 18/62; A01G 18/69; A01G 18/20; A01G 18/00
USPC .......................................................... 47/1.1
See application file for complete search history.

(56) References Cited

U.S. PATENT DOCUMENTS

2016/0135384 A1 5/2016 Souder et al.
2020/0100437 A1* 4/2020 Christiaens ............ A01G 18/62

FOREIGN PATENT DOCUMENTS

| CN | 103238477 A | 8/2013 | |
|---|---|---|---|
| CN | 203985152 U | 12/2014 | |
| CN | 105917957 A | 9/2016 | |
| CN | 207040403 U | 2/2018 | |
| CN | 207040404 U | * 2/2018 | |
| CN | 207040404 U | 2/2018 | |
| EP | 3387896 A2 | * 10/2018 | ............ A01G 18/70 |

(Continued)

OTHER PUBLICATIONS

Canadian examination report dated Oct. 27, 2020, from Canadian Application No. 3,045,087, 8 sheets.

(Continued)

*Primary Examiner* — Monica L Barlow
*Assistant Examiner* — Aaron M Rodziwicz
(74) *Attorney, Agent, or Firm* — Katten Muchin Rosenman LLP

(57) ABSTRACT

The present invention relates to a device for growing mushrooms, including beds for holding compost and a shelving arranged for supporting the beds for holding compost. The beds are placed at a mutual distance above each other. The beds are movable between at least a first position, wherein a second bed supported above a first bed at least partially impedes the accessibility of the first bed in a direction perpendicular to the plane in which the first bed extends, and a second position in which at least a larger part of the first bed is free approachable from a direction perpendicular to the plane in which the first bed extends than in the first position. The shelving includes at least one portal. The portal includes at least two essentially vertical stands connected by at least one beam that extends from a first stand to the second stand. At least two beds are movably supported by the at least one beam.

14 Claims, 1 Drawing Sheet

(56) References Cited

FOREIGN PATENT DOCUMENTS

| FR | 1066500 A | * | 6/1954 | ............ A01G 18/62 |
|---|---|---|---|---|
| FR | 1116739 A | * | 5/1956 | ............ A01G 18/69 |
| WO | WO-2005077152 A1 | * | 8/2005 | ............ A01G 31/06 |
| WO | WO2005077152 A1 | | 8/2005 | |
| WO | WO-2017078535 A1 | * | 5/2017 | ............ A01G 18/62 |
| WO | WO-2017105067 A1 | * | 6/2017 | ............ A01G 31/06 |
| WO | WO-2019226046 A1 | * | 11/2019 | ............ A23K 50/75 |
| WO | WO-2020013756 A1 | * | 1/2020 | ............ A01G 18/62 |

OTHER PUBLICATIONS

EPO International Search Report w/Written Opinion for Dutch priority application 2021456 dated Mar. 11, 2019.

* cited by examiner

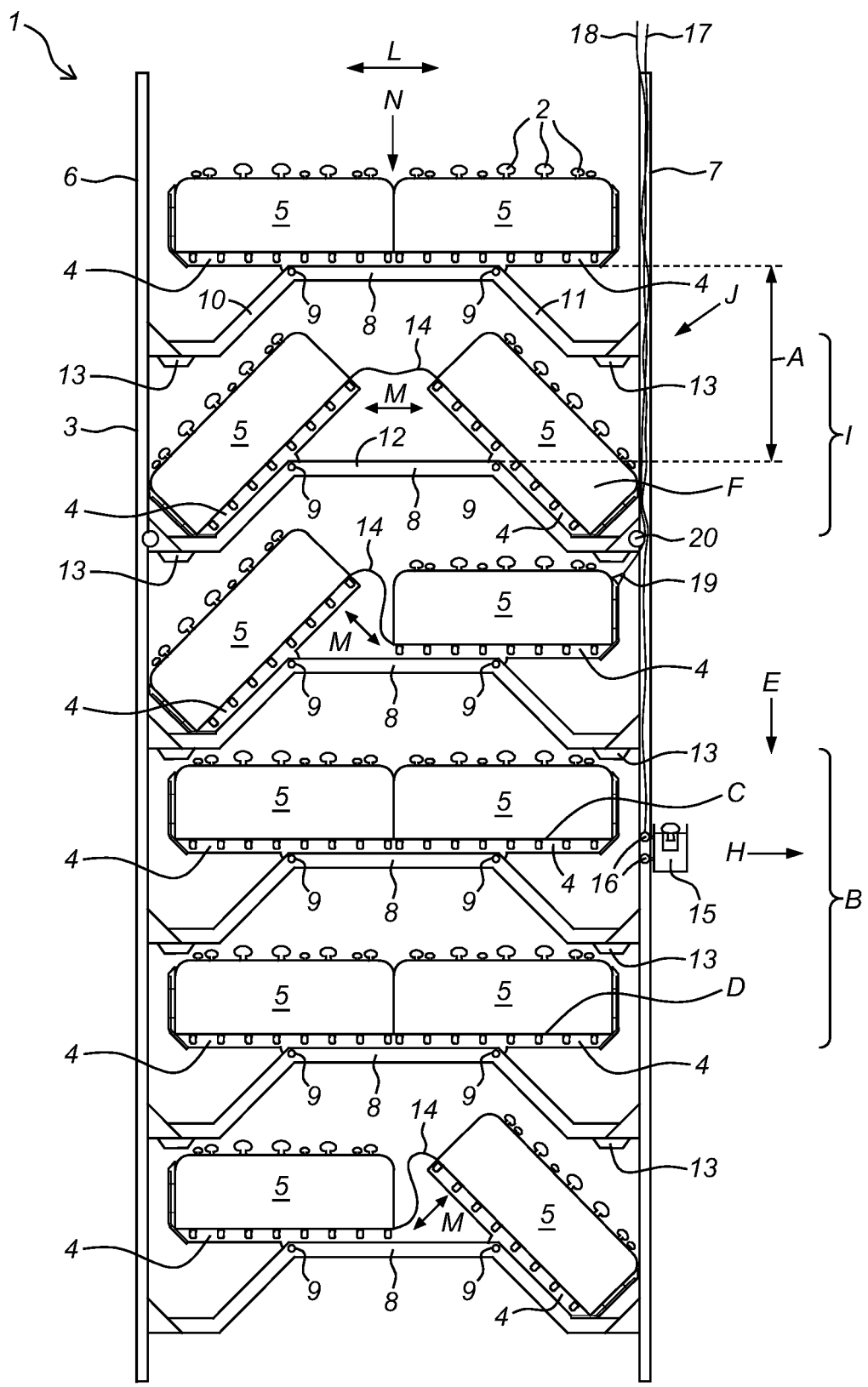

DEVICE FOR GROWING MUSHROOMS

CROSS-REFERENCE TO RELATED APPLICATIONS

This application claims priority of Dutch (NL) Patent Application Number 2021456, entitled "DEVICE FOR GROWING MUSHROOMS," filed on Aug. 10, 2018 in Netherlands Patent Office, and herein incorporated by reference in its entirety.

TECHNICAL FIELD

The present invention relates to a device for growing mushrooms.

BACKGROUND

At industrial scales, mushrooms are traditionally grown at indoor locations, often called growing rooms, wherein shelvings are placed that support beds for holding compost and casing soil, on which the mushrooms are grown. The compost and casing soil are placed on pulling nets, that allow to fill and empty the bed with compost and casing soil easily. Usually, this is done after every two or three flushes of mushrooms, since the compost has lost its fertility and nutrition then. The beds are placed at a mutual distance above each other in the shelving, and harvest of the mushrooms takes place manually by harvesters, standing next to the beds at various height levels and delivering the mushrooms to harvesting conveyors once they are cut. From there on they are further processed, either manually or in an automated way.

The beds have an average length of 10 to 100 meters, a width of 0.5 to 2 meters, and are usually placed 0.4 to 1.4 meters above each other. As a result, the harvesters cannot reach all mushrooms without stooping. Given the required speed of working and the total length of the beds, this makes harvesting a cumbersome job, with even certain health risks. Moreover, harvesters tend to stand straight to avoid a painful back, but in this position they only have sight to a part of the bed, with the result that part of the harvesting takes place on intuition, which may have a negative impact on the quality of the work, since a better selection can be made when an eye is kept on the work.

The Dutch Patent Application N2021053 by the same Applicant proposes a number of improvements with respect to the existing shelvings. In particular the embodiment with two beds at the same height in the shelving has appeared to be advantageous. However, practical tests have raised room for further improvement of this specific embodiment.

SUMMARY

It is a goal of the present invention to provide a device for growing mushrooms that further improves the prior art. Advantages of embodiments described herein may be provided, for example, by a device for growing mushrooms, which includes a shelving supporting beds for holding compost, wherein the beds are placed at a mutual distance above each other. The beds are movable between at least a first position, wherein a second bed supported above a first bed at least partially impedes the accessibility of the first bed in a direction perpendicular to the plane in which the first bed extends, and a second position in which at least a larger part of the first bed is free approachable from a direction perpendicular to the plane in which the first bed extends than in the first position wherein the shelving comprises at least one portal, the portal comprising at least two essentially vertical stands, connected by at least one beam that extends from a first stand to the second stand. The beds are movably supported by the at least one beam.

With impeding the accessibility of the first bed is meant that the bed cannot be reached because there is another bed in the way for the harvester. A direction perpendicular to the plane in which the first bed extends is—in case of a bed that extends in a horizontal plane which is the common orientation for a bed for growing mushrooms—the direction from straight above. If the bed is under an angle with the horizontal plane, this perpendicular direction changes of course.

Free approachable means that a harvester does not need to bend or that his or her sight is not impeded because of an overlaying bed. That means that there is at least a free zone of 40 centimeters, preferably at least 50 centimeters and more preferably more than 60 centimeters in the perpendicular direction.

In the devices according to the state of the art, beds are arranged on top of each other. In such case, the harvester has to work in between beds that are on top of each other. The device according to the present invention takes away this disadvantage and makes the mushrooms available for harvesting and visible for inspection during harvest.

The device according to the present invention has several further advantages. With respect to the construction disclosed in Dutch Patent Application N2021053, a smaller and lighter construction is obtained. Since a portal offers inherent stability, there is no need for a broad foot under the shelving, but the lower end of a stand, which is normally formed by a rod or pipe, provides the stability, which leads to a hygienic advantage, since a smaller floor surface is covered this way. The increased stability evidently provides safety benefits.

These and other advantages may also be provided, for example, by a method for harvesting mushrooms from a shelving. The method includes moving at least part of a shelving between at least a first position. A second bed supported above a first bed at least partially impedes the accessibility of the first bed in a direction perpendicular to the plane in which the first bed extends, and a second position in which at least a larger part of the first bed is free approachable from a direction perpendicular to the plane in which the first bed extends than in the first position.

BRIEF DESCRIPTION OF THE DRAWINGS

The drawing FIGURES depict one or more implementations in accord with the present concepts, by way of example only, not by way of limitations. In the FIGURES, like reference numerals refer to the same or similar elements.

FIG. 1 is a schematic side-view of a device according to the present invention.

DETAILED DESCRIPTIONS

It is to be understood that the figures and descriptions of the present invention may have been simplified to illustrate elements that are relevant for a clear understanding of the present invention. It is also to be understood that the drawings included herewith only provide diagrammatic representations of the presently preferred structures of the present invention and that structures falling within the scope of the present invention may include structures different than those shown in the drawings. It is also to be understood that the invention is not limited in its applications to the details of the particular arrangements shown since the invention is capable of other embodiments. Also, the terminology used herein is for the purpose of description and not of limitation. In the Summary above and in the Detailed Descriptions and in the accompanying drawings, reference is made to particular features of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

In a preferred embodiment the device comprises multiple beams extending from the first stand to the second stand at various heights along the stands. Each beam movably supports two beds. The beams essentially connect the stands in a horizontal direction, but their shape is not limited to a straight line, as will be elucidated later on.

It is further preferred that in the first position, two beds supported by the same beam are positioned in the same plane against each other. This provides the benefit that a very compact solution can be provided, which offers to place more shelvings in the same cell, or to have the same production capacity in the same cell. A further advantage obtained is that the beds can be filled with compost and casing soil easily with a filling apparatus as described in the Dutch Patent Application N2021123 by the same applicant. Herein, a choice can be made if two separate layers of compost and casing soil are applied on the beds, or if a separation is made at a later stage.

In yet a further preferred embodiment two beds supported by the same beam each have only one side board, arranged at the side facing away from the other bed. This way, in their first positions, the beds together provide a flat surface that can be filled in one single operation, and two adjacent beds may even share the same pulling net. In that case, two beds supported by the same beam share a pulling net that extends over the width of both beds, and preferred comprises an expandable middle section for allowing coverage of both beds when at least one of the beds is in the second position. When at least one of the beds is in the second position, the beds are no longer adjacent, and a gap is then filled by the pulling net. The pulling net may be over dimensioned for that purpose, and be flexible or include a flexible part.

Configurations within the scope of the present invention are thinkable wherein movement of the beds requires both beds to change place or orientation, but preferably the displacement between the first and the second position requires a displacement of the first bed only. This keeps both the technical configuration and the use of the device as simple as possible.

In a preferred embodiment of the invention, the beds may be equal and be positioned exactly above one another in vertical direction. This leads to an efficient use of space in the growing room or other location where the shelving is placed, and also makes the work for the harvesters easier, since they do not need to adapt their position or the tooling they work with when changing from bed to bed. Additionally, this standardization has benefits in production, and in the use of tooling like pulling nets, picking lorries and/or picking platforms.

In a preferred embodiment, the first bed is in the second position completely freely accessible from a direction perpendicular to the plane in which it extends. The displacement between the first and the second position may for instance include a translation of a bed. In such case, the bed is arranged in a drawer-like configuration to the shelving. That means that the translation takes place in the width direction of the bed. One benefit of such system is that the orientation of the bed remains the same, that is in most cases essentially horizontal. However, such drawer-like configuration has the disadvantage that it requires more space around the shelving. In a preferred embodiment therefore, the displacement between the first and the second position may include a rotation of a bed. This embodiment has the advantage that a relatively simple construction can be applied, but additionally, that there is no more space required than the devices according to the prior art require.

Preferably, the rotation of a bed takes place around an axis in the longitudinal direction of the bed which axis is situated at the underside of the bed, and is positioned in the middle in the width direction. This way, the bed is balanced and its rotation requires the least force that is in a practical embodiment obtainable. Moreover, the rotation around an axis at the bottom of the bed contributes to the accessibility of the bed in the second position, since the outmost point of the bed moves toward the harvester this way.

The bed may be rotatable to a maximum between 0 and 90 degrees, more preferably between 30 and 60 degrees and most preferably to a maximum angle of 45 degrees with respect to a horizontal position, in order to avoid the compost, soil ground and mushrooms to fall out of the bed when the bed is in its maximum rotated orientation. Furthermore it has appeared that an angle around 45 degrees is a convenient harvesting angle. An operating device, such as a spindle may be provided for easy and controlled movement of the bed from the first position to the second position.

In yet a further embodiment, there is a pair of beds at the same height supported by the shelving, which beds extend parallel to each other. The pair of beds may be rotatable on the same layer in the opposite direction. Such pair has the advantage that it may be dimensioned half as big as a bed according to the state of the art, in order to make the picking easier, or, dimensioned the same size, but then requiring less shelving equipment to support the same amount of bed surface. The beds may each have a width between 0.5 and 2 meters, and/or have a length between 10 and 100 meters.

In yet a further embodiment, the device may be provided with a height-adjustable conveyor belt, which extends in the longitudinal direction of the beds, and is movable in height to positions which correspond to a lower end of a bed situated in a second position.

The invention will now be elucidated into more detail with reference to FIG. 1 that shows a device 1 for growing mushrooms 2. The device 1 includes a shelving 3, supporting beds 4 for holding compost 5. The shelving 3 includes at least one portal, and the portal includes at least two essentially vertical stands 6 and 7, connected by beams 8 that extend from a first stand to the second stand. At least two beds 5 are movably supported by the at least one beam 8.

The beds 4 are placed at a mutual distance A above each other, and movable between a first position B, wherein a second bed C supported above a first bed D at least partially impedes the accessibility of the first bed D in a direction E perpendicular to the plane H in which the first bed D extends, and a second position I in which at least a larger part of a first bed F is free approachable from a direction J perpendicular to the plane K in which the first bed F extends than in the first position.

The displacement between the first and the second position requires a displacement of the first bed F only. The first bed F is in the second position (shown) completely freely accessible from a direction perpendicular to the plane K in which it extends. The displacement between the first and the second position includes a rotation of the bed F, around an axis 9 in the longitudinal direction of the bed which axis 9 is situated at the underside of the bed F, and is positioned in the middle in the width direction L.

The bed F is shown at its maximum angle of 45 degrees with respect to a horizontal position. The angular rotation is limited by a stop 10. Stop 10 forms part of beam 8, that, seen in a direction from stand 6 to stand 7, includes an upwardly oriented section 11, a first support 9 for a first bed 4, a connecting section 12, a second support 9 for a second bed 4, and downwardly oriented section 10. Sections 10 and 11 form stops in the second positions for respective beds 4, and the connecting section 12 extends in this example essentially horizontally, and forms as such a stop for two beds 4 in a first position. Additionally, beams 8 may include lighting elements 13, for illuminating beds 4 supported by lower beams 8.

FIG. 1 also shows pulling nets 14, that are dimensioned such that they can cover a gap M between two beds 4, when one or both beds are in the second position. Before rotating the beds, a cut can be made in the compost and casing soil, for instance with a knife or saw, above the separation of two adjacent beds N, to ensure that the compost and soil equally spread over the beds. Such cut may in particular be necessary when the compost and casing soil are provided as one layer over the two adjacent beds. The stands 6 and 7 are configured as a guide for a harvesting conveyor 15. The stand is therefore at least partly hollow such as C or U profile, and is provided with a slot through which wheels 16 of the harvesting conveyor 15 are guided. The stand may be provided with a slot for a wire for supporting a bed and/or harvesting conveyor. The harvesting conveyor may be supported by a wire 17 which is also guided by the stand 7. A second wire 18 may be present, that is led via a wheel 20 to a connection 19 with a bed 4. By means of wire 18 the bed may be supported and lifted from its second to its first position.

The device 1 may include an operating device for moving a bed from the first position to the second position. The operating device may include a spindle, an electric actuator, a pneumatic or hydraulic actuator such as a pneumatic or hydraulic cylinder.

The FIGURE is for illustrative purposes only and does in no sense limit the scope of protection as defined by the following claims. The examples given are examples only and do in no sense limit the scope of protection of the present invention as defined by the following claims. The terms and descriptions used herein are set forth by way of illustration only and are not meant as limitations. Those skilled in the art will recognize that many variations are possible within the spirit and scope of the invention and the embodiments described herein.

What is claimed is:

1. A device for growing mushrooms, comprising:
   a plurality of beds for holding compost;
   a shelving arranged for supporting the beds for holding compost, wherein the beds are placed at a mutual distance above each other, and the beds are movable between at least:
   a first position, wherein a second bed supported above a first bed at least partially impedes the accessibility of the first bed in a direction perpendicular to the plane in which the first bed extends; and
   a second position in which at least a larger part of the first bed is freely approachable from a direction perpendicular to the plane in which the first bed extends when in the first position, wherein the shelving comprises at least one portal, and wherein the portal comprises at least two essentially vertical stands that are connected by at least one beam that extends from a first stand to a second stand, and the plurality of beds are movably supported by the at least one beam; and
   wherein a displacement between the first position and the second position comprises a rotation of the first bed around an axis in the longitudinal direction of the first bed which axis is situated at the underside of the first bed, and is positioned in the middle in the width direction of the first bed.

2. The device according to claim 1, further comprising multiple beams extending from the first stand to the second stand at various heights along the stands, wherein each beam movably supports two beds.

3. The device according to claim 1, wherein in the first position, two beds supported by the same beam are positioned in the same plane against each other.

4. The device according to claim 1, wherein two beds supported by the same beam each have only one side board, arranged at the side facing away from the other bed.

5. The device according to claim 1, wherein two beds supported by the same beam share a pulling net that extends over the width of both beds, and comprises an expandable middle section for allowing coverage of both beds when at least one of the beds is in the second position.

6. The device according to claim 1, wherein the beam, seen in a direction from stand to stand, comprises an upwardly oriented section, a first support for a first bed, a connecting section, a second support for a second bed, and a downwardly oriented section.

7. The device according to claim 6, wherein the upwardly and downwardly oriented sections form a stop for a bed in a second position.

8. The device according to claim 6, wherein the connecting section extends essentially horizontally, and forms a stop for two beds in a first position.

9. The device according to claim 1, wherein the bed is rotatable to a maximum angle between 0 and 90 degrees, preferably between 30 and 60 degrees and more preferably to a maximum angle of 45 degrees with respect to a horizontal position.

10. The device according to claim 1, further comprising an operating device for moving a bed from the first position to the second position, wherein the operating device comprises a spindle, an electric actuator, a pneumatic or hydraulic actuator including a pneumatic or hydraulic cylinder.

11. The device according to claim 1, wherein the beds each have a width between 0.5 and 2 meters, and/or have a length between 10 and 100 meters, and in particular wherein the beds each have a width between 0.4 and 1 meter and more in particular between 0.6 and 0.8 meters.

12. The device according to claim 1, wherein the device is provided with a height-adjustable conveyor belt which extends in the longitudinal direction of the beds, and is movable in height to positions which correspond to a lower end of a bed situated in a second position.

13. The device according to claim 1, wherein at least one stand is at least partly hollow having a C or U profile, and is provided with a slot for wheels of a harvesting conveyor and/or provided with a slot for a wire for supporting a bed and/or harvesting conveyor.

14. A method for harvesting mushrooms from a shelving, comprising:
  moving at least part of a shelving between at least a first position, wherein a second bed supported above a first bed at least partially impedes the accessibility of the first bed in a direction perpendicular to the plane in which the first bed extends and a second position in which at least a larger part of the first bed is freely approachable from a direction perpendicular to the plane in which the first bed extends when in the first position, and
  wherein moving the at least part of the shelving between the first position and the second position includes displacing at least part of the shelving a displacement that comprises a rotation of a bed of the plurality of beds around an axis in the longitudinal direction of the bed which axis is situated at the underside of the bed, and is positioned in the middle in the width direction of the first bed.

* * * * *